US011132783B2

(12) United States Patent
Cupit et al.

(10) Patent No.: US 11,132,783 B2
(45) Date of Patent: Sep. 28, 2021

(54) VISUAL VERIFICATION SYSTEM AND METHOD

(71) Applicant: Dover Europe Sàrl, Vernier (CH)

(72) Inventors: James Cupit, Nottingham (GB); Michal Maciejewski, Kimberley (GB); Steven Keddie, Marietta, GA (US)

(73) Assignee: DOVER EUROPE SÀRL, Vernier (CH)

( * ) Notice: Subject to any disclaimer, the term of this patent is extended or adjusted under 35 U.S.C. 154(b) by 58 days.

(21) Appl. No.: 16/518,149

(22) Filed: Jul. 22, 2019

(65) Prior Publication Data

US 2020/0034961 A1 Jan. 30, 2020

(30) Foreign Application Priority Data

Jul. 24, 2018 (EP) ..................................... 18185182

(51) Int. Cl.
| | | |
|---|---|---|
| *G06T 7/00* | (2017.01) | |
| *G06T 7/62* | (2017.01) | |
| *G06T 7/70* | (2017.01) | |
| *H04N 5/232* | (2006.01) | |
| *G06K 19/06* | (2006.01) | |

(52) U.S. Cl.
CPC ...... *G06T 7/0004* (2013.01); *G06K 19/06028* (2013.01); *G06K 19/06037* (2013.01); *G06T 7/62* (2017.01); *G06T 7/70* (2017.01); *H04N 5/23218* (2018.08); *G06T 2207/30144* (2013.01)

(58) Field of Classification Search
CPC ........... G06T 7/0004; G06T 7/62; G06T 7/70; G06T 2207/30144; H04N 5/23218; G06K 19/06037; G06K 19/06028
See application file for complete search history.

(56) References Cited

U.S. PATENT DOCUMENTS

| | | | |
|---|---|---|---|
| 2003/0227526 A1* | 12/2003 | Okino | C09D 11/328 347/100 |
| 2004/0051061 A1 | 3/2004 | Warner | |
| 2008/0007762 A1* | 1/2008 | Robertson | B41J 3/36 358/1.15 |
| 2012/0105522 A1* | 5/2012 | Wallsten | B41J 2/04 347/9 |

(Continued)

FOREIGN PATENT DOCUMENTS

| | | | |
|---|---|---|---|
| GB | 2566111 | * | 5/2017 |
| JP | 2007019853 A | | 1/2007 |

(Continued)

OTHER PUBLICATIONS

Extended European Search Report from corresponding European Application No. 18185182.5, dated Dec. 13, 2018.

*Primary Examiner* — Zaihan Jiang
(74) *Attorney, Agent, or Firm* — Tucker Ellis LLP

(57) ABSTRACT

A verification system for verification of a print output from a printing device includes at least one image recording device arranged spaced apart from the printing device. The printing device is configured to compute when a printed area passes the image recording device after a printing operation by a print head of the printing device, and generate a signal to the image recording device. The signal activates the image recording device to capture an image of a printed area and process the image for detecting, if the print out meets certain parameters.

18 Claims, 6 Drawing Sheets

(56) References Cited

U.S. PATENT DOCUMENTS

| | | | | |
|---|---|---|---|---|
| 2012/0194791 A1* | 8/2012 | Duss | ...................... | B26D 5/007 |
| | | | | 355/53 |
| 2013/0286073 A1* | 10/2013 | Blessing | ................ | B33Y 10/00 |
| | | | | 347/14 |
| 2014/0111568 A1* | 4/2014 | Garcia | ................... | B41J 2/1721 |
| | | | | 347/6 |
| 2016/0375709 A1* | 12/2016 | Nguyen | ............. | H04N 1/00782 |
| | | | | 347/19 |
| 2018/0150047 A1* | 5/2018 | Shapiro | ................ | G05B 19/402 |

FOREIGN PATENT DOCUMENTS

| | | |
|---|---|---|
| WO | 2016009244 A1 | 1/2016 |
| WO | 2017090317 A1 | 6/2017 |

\* cited by examiner

VISUAL VERIFICATION SYSTEM AND METHOD

TECHNICAL FIELD

The present invention provides methods and systems for capturing a visual image of a particular area of focus of a print-out in a printing system and assesses whether it meets particular criteria.

BACKGROUND

Consumer and industrial goods require a great deal of product identification (e.g., expiring dates, traceability data, etc.). The information to be printed may vary from one item to another, from one batch of similar items to another, from one site or time of manufacture to another, and/or from one type of print technology to another.

One example of an industrial coding and marking environment may be the printing of labels on various types of packages or consumer goods.

Another example is where multiple coding and marking printers, either of same technology or of different technologies are configured to simultaneously print information on various types of products or items (two sides of a package, combination of visible and invisible printed information, etc.).

Printing and labelling is an importing step in production and packaging of goods.

In an industrial printing environment, numerous printers are typically configured to substantially simultaneously print information on various types of items. Different parameters affect the result of printing, e.g.:
- Speed, which may depend on the space between the goods or belt conveyor speed,
- Surface type (material),
- Surface shape,
- Printer head and/or print technology,
- Environmental parameters, such as humidity, contamination, and/or
- A combination thereof.

Thus, it is of great importance to achieve a good quality print result independent of above mentioned exemplary parameters.

In case of barcodes, for example, slight impairment of the printed barcode may affect the scanning result.

Consequently, it is often desired to automatically verify that a printed code or marks has been printed or meet certain criteria, so that if the printer malfunctions an alarm is provided to an operator to fix the malfunction and find the products that have not been marked as desired and thus minimize the amount of product that has to be reworked.

One method for verifying malfunctions includes visual verification systems. Visual verification systems function by firstly capturing a visual image of a particular area of focus then subsequently assessing whether it meets particular criteria. In one example, when deployed into continuous printing applications, such a system can be deployed to ensure the print process results in the correct marking of continually moving substrate:
- The printer marks the substrate as it moves beneath the print-head.
- The marked substrate continues to move into the field of vision of the verification system
- The verification system captures a visual image and assesses whether the markings are acceptable.

Some disadvantages may include: High-end expensive cameras may provide their own internal encoder monitoring functions. In such a deployment, the encoder and print go signal would be connected to both the printing system and verification system. The camera would scan the substrate following a fixed distance of substrate movement after receiving the print go signal.

The following disadvantage may accrue by functional differences due to the fact that the camera is not triggered in direct relation to the print process: If the intended print position (relative to the print go signal) changes on the substrate, the camera configuration must also be changed to guarantee it triggers at the correct position. For example, if the print job is changed so that the printer must produce a print positioned 60 mm on from receiving the print go signal instead of 100 mm, the camera configuration would need to be changed to capture an image 40 mm earlier.

It is possible to configure external hardware such as a Programmable Logic Component (PLC) to perform essentially the same job of receiving either the print go signal, or alternatively, "first dot" signal from the printer, monitoring substrate movement then triggering the verification system to scan after a defined amount of movement.

This opportunity is, however, limited by processing capabilities of such hardware. In real applications, it is likely that the number of prints between the printer and verification system can be up to twenty (20). PLC components are unlikely to have sufficient power to monitor the required number of camera trigger distances concurrently as in the solution we present. They would also have to be reprogrammed if the number of prints between the printer and camera changes.

In one solution may be employed to deploy a PLC capable of monitoring a signal expiry distance only. It has disadvantages of:
- Requiring reconfiguration of the pack length (distance between prints) changes; and
- Having to ignore the first N signals generated prior to the first print arriving beneath the camera.

Even if more powerful technology is deployed (e.g. a "PIC" microcontroller based solution) that is capable of monitoring concurrent distances, this hardware would not have a knowledge of the length of image printed. Again, this means that the system would have either accept a non-centrally positioned image or reconfigured when images lengths change.

Moreover, currently there are no solutions that completely resolve the Form-Fill-Seal (FFS) verification solutions in one package. In case of film substrates, for example, independent systems have to be used to read the film stock code or the film product making code. The independent systems are complex to setup for a FFS operator. Current solutions do not fully resolve the issues with ensuring using the right film (substrate) for the product with the right code printed. Current independent systems allow for operator errors and therefore may put the producers brand and customer safety at risk.

SUMMARY

Exemplary embodiments of the present invention aim to minimise printing, packaging and purchase costs and eliminate above mentioned disadvantages and unnecessary print assignments resulting in a faster, more consistent and more efficient production line. The invention is suitable for industrial print assignments. Moreover, the present invention aims to simplify the process of determining when the verification system should capture its visual image.

Within the solution presented, a camera is triggered with respect to the onset of the print. The process of triggering the verification scan is thus isolated from changes and variations.

In one solution, the camera may be interfaced indirectly to the printer's "first dot signal" via a PLC component to count encoder pulses received and then generate an output to trigger the verification system.

Yet, another purpose of the invention may be to trigger the camera when each produced print is positioned (substantially) centrally within the camera's field of view in a fashion that:
  It does not rely on functionality within the camera to self-monitor substrate movement;
  It does not rely on any other external components (e.g. PLC components) to monitor substrate movement;
  It is independent of changes to the distance between prints on the substrate (i.e. pack length), position of prints within a pack (i.e. print registration) and length of print;
  In one embodiment, by avoiding the need for external hardware or encoder monitoring functionality within the verification system, costs are reduced and available choice of verification system is widened; and
  By directly relating the verification system trigger signal to the "first dot" of the print process and supporting monitoring of concurrent trigger distances defined in relation to the fixed, measurable distance between the printer and camera:
    The system is made independent of changes to job specific details such as pack length and intended print position; and
    The verification system may always scan when the printed image is central to the cameras field of vision.

For these reasons a printing and verification system for verification of a print output from a printer device. The verification system comprises at least one image recording device arranged spaced apart from the printing device. The printing device is configured to compute when a printed area passes the image recording device after a printing operation by a print head of the printing device, and generate a signal to said image recording device, which signal activates said image recording device to capture an image of a printed area.

In one embodiment the signal generated by the printing device is generated with respect to a distance between the print head and the image recording device and a printed image parameter printed by said printing device. The signal thus may further depend on one or several of: size of the printed image; an area of interest on the printed image.

In on embodiment the system may be arranged in a continues printing application in which a substrate and the printing device move relative each other. In one embodiment, the substrates moves and printing device is stationary. In another embodiment, the printing device moves and the substrate is stationary.

In one embodiment, the printing device may be configured to receive information about the relative speed of the substrate.

The system may also comprise a second image recording device. The second image recorder may be configured to verify a second set of data. The second set of data may be one or several of: packaging information; substrate information, or content information.

The system may also be configured to monitor a number of trigger distances concurrently with respect to a number of distinct image prints between the printer device and a visual field of the image recording device.

In one embodiment, a distance for generating the signal, initiation distance, is offset to focus on a specific feature of a printed image. The trigger distance may be represented by:

$$t_d = d + ((i_w - f_x) - (f_w/2))$$

wherein
  $t_d$ is the trigger distance;
  d is a camera trigger distance;
  $i_w$ is an image width;
  $f_x$ is a position of field to image border; and
  $f_w$ is width of the field of interest.

The invention also relates to a printing device for use in a system.

The invention also relates to a method of capturing a visual image of a particular area of focus of a print-out for determining if a print-out meets particular criteria in a printing system comprising a printing device. The method comprises: generating by the printing device a signal and transmitting to an image recording device, the signal generated with respect to a distance between a print head of the printing device and a focal point of the image recording device; and the image recording device capturing an image of the print-out when receiving the signal from printing device. The method may further comprise: recording a field of interest by a first image recorder; providing by the image recorder image data to a controller; verifying data by the controller based on the image data; and providing print data to the printing system with respect to the data from the first image recorder.

BRIEF DESCRIPTION OF THE DRAWINGS

In the following, reference is made to the attached drawings, illustrating schematic embodiments of the present invention.

DETAILED DESCRIPTION

The following detailed description refers to the accompanying drawings. The same reference numbers in different drawings may identify the same or similar elements.

The term "image," as used herein, may refer to a digital or an analog representation of visual information (e.g., a picture, barcode, character, etc.).

The term "trigger signal" as used herein, may refer to an electrical (or mechanical) signal or pulse from one device to another device for initiating an action or event.

Figure 1:
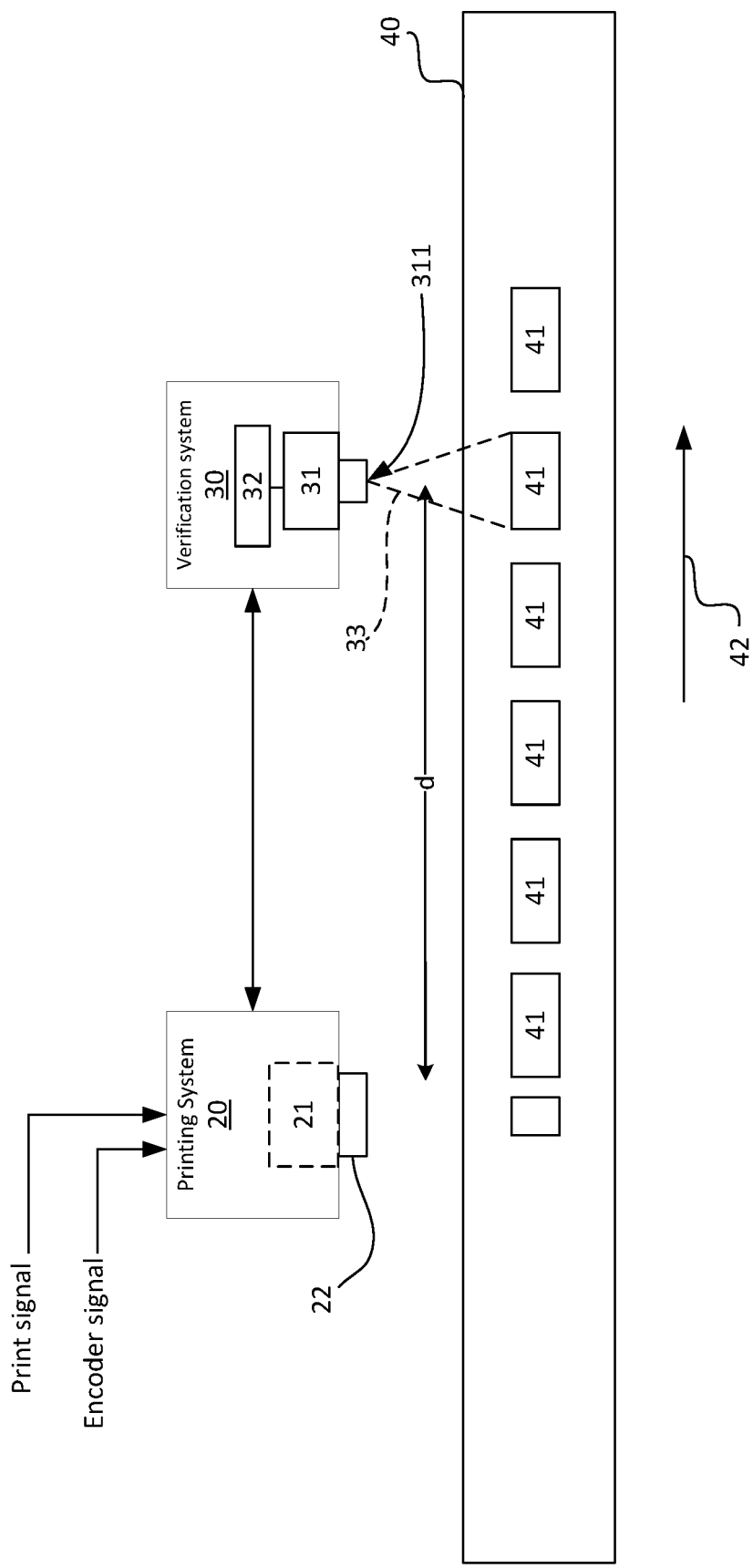
FIG. 1 is a diagram of a first exemplary system in which methods and systems described herein may be implemented.

A print and verification system 10 according to the present invention is illustrated in diagram of FIG. 1. The system 10 comprises a printing system 20 and a verification system 30.

The printing system 20 may comprise any type of printing device 21 in general and an industrial printer in particular. The printing system may comprise, e.g. one or several of ink jet (continues, Drop on Demand, thermal), thermal transfer, laser, hot melt inkjet, digital printer, piezo printer, valvejet, etc. The printing system may receive print signal and encoder signal from a printer controller and an encoder (not shown). The printer device comprises one or several print-heads 22.

The image recording and verification system 30 may comprise a camera 31 and a controller 32. The camera 31 may comprise an optical lens 311 and image recording parts (not shown). The camera may record still or motion pictures in visible or invisible light spectrums. The controller 32 is described in more detail below. The image recording and verification system may be realized as two or more separate systems (camera and verification system) or combined as one system. The printing system may further comprise print controllers communications Shortly, according to the invention, during the installation process:

The verification system 30 is interfaced to the printer system 20 such that the printer 21 can generate a trigger signal;

A distance d (e.g. downstream along a production line or print line) between the print-head 22 and the vision system's focal point at the optical lens 311 is measured, the measurement may be from the centre of the dot marking location of the print head to the focal point of the camera (normally the centre of the lens).

The measured distance is then entered to a printer memory (not shown) as a "camera trigger distance setting value".

In a simple solution, the substrate movement is monitored as an internal process within the printer and a trigger signal to camera is generated when each print is computed to be positioned within the camera's field of view.

The camera captures an image of the printed area upon reception of the trigger signal.

The captured image is processed to find out if the print out meets certain (quality) parameters.

The measurement of the distance may be carried out manually or automated, e.g. using distance measuring sensors, mechanical, ultrasound or light based sensors.

According to this embodiment, the printing system 20 may be configured to print on a substrate 40 travelling under the print-head 22. However, in one embodiment the printing system or print-head may be arranged to move over a still substrate. In yet another embodiment the substrate and printing system/print-head may move relative each other. The substrate 40 may consist of any suitable material. The print-head transfers information onto the surface of the substrate and generates a printed area (image) 41. The arrow 42 illustrates the travelling direction of the substrate 40. The travelling speed v of the substrate (or relative speed between the print-head substrate) may also be recorded in the memory of the printer or obtained from the encoder.

While printing: following the first print of every image 41, the printer system 20 starts monitoring substrate movement e.g. using an encoder (not shown). When the substrate 40 has moved a camera trigger distance and image position distance, the printer generates a trigger signal, i.e. the printer (or a (printer) controller in connection with the printer) calculates the time for transmitting a trigger signal to the camera with respect to the distance the substrate and/or the printer have moved (relative each other). The image position distance may for example be "image length/2". The image length is included into the equation so that the image is positioned centrally within the camera's visual field 33 (the captured image).

In one embodiment, the printing system 20 can be capable of monitoring a number of trigger distances concurrently as there may be a number of distinct prints between the printer and the verification system's visual field 33.

Figure 2:
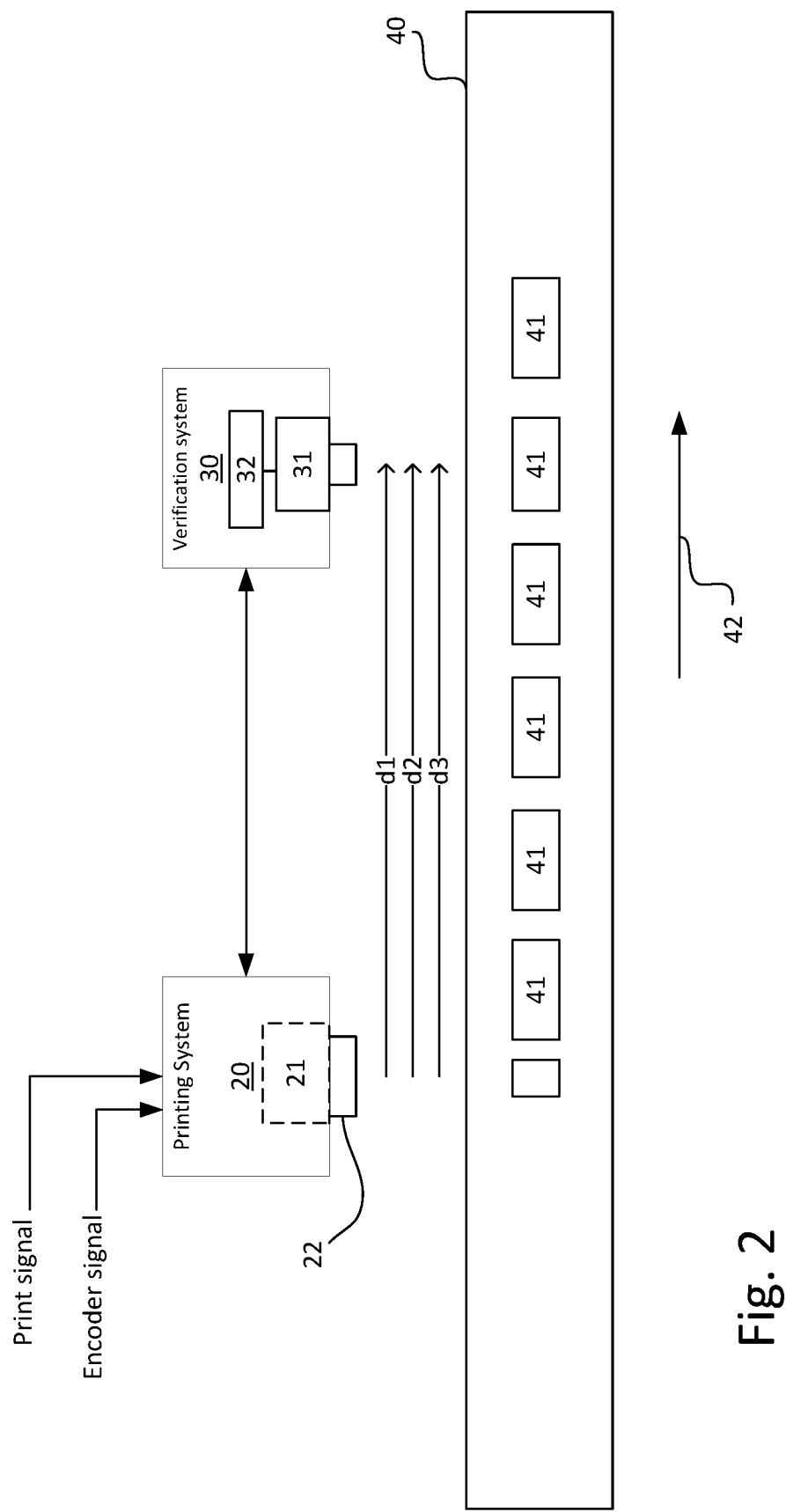
FIG. 2 is a diagram of a second exemplary system in which methods and systems described herein may be implemented.

This is diagrammatically depicted in FIG. 2 for a case where the camera trigger distance accommodates for example three prints between the print-head 22 and camera 31. $d_1$-$d_3$ represent the trigger signal distances for three prints.

When leaving the printing state, the queue of trigger distances may be cleared.

Figure 3:
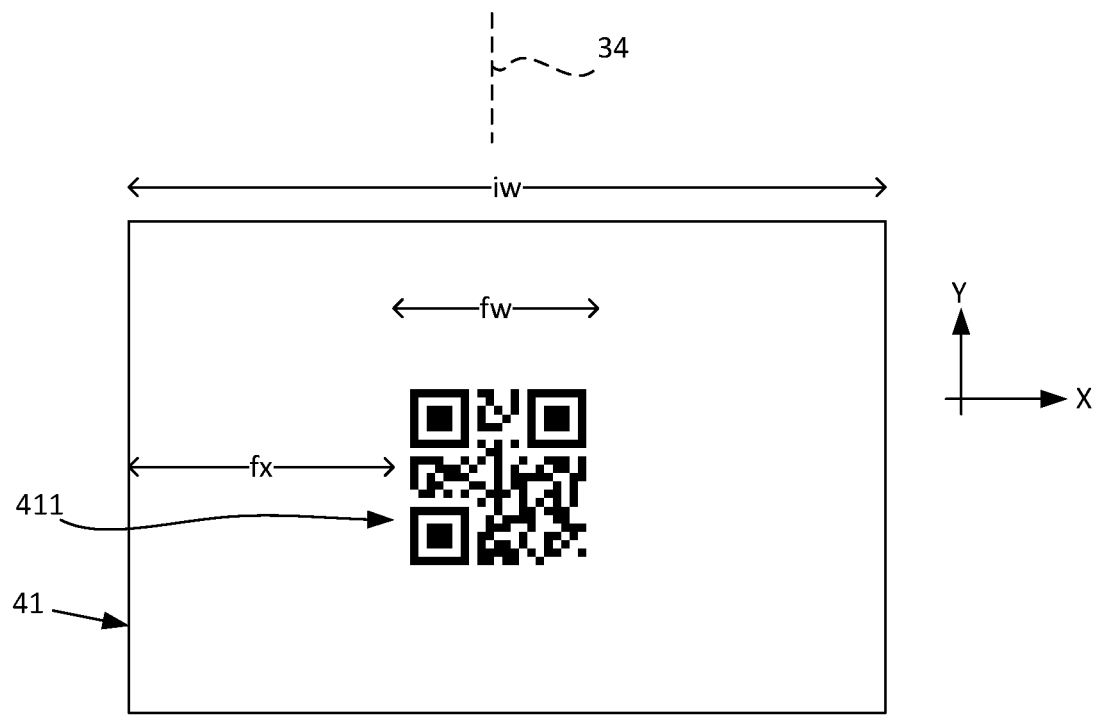
FIG. 3 illustrates a schematic view of a printed image.

In one embodiment, it is possible to offset the trigger distance to focus on a specific feature of the printed image 41. FIG. 3 illustrates an image 41 comprising a QR-code field 411.

As the printer knows the position of the fields within the printed image, it is also able to trigger the camera such that a specific field of interest is centralized within the captured image. This involves including the field's x (with respect to XY-axes) position and width into the equation (1) governing the trigger distance. Dashed line 34 represents focal point of the camera lens. Then the trigger distance $t_d$ may then be represented by:

$$d_t = d + ((i_w - f_x) - (f_w/2)) \quad (1)$$

wherein $d_t$ is the trigger distance to center of field of interest;
d is the camera trigger distance;
$i_w$ is the image width;
$f_x$ is the position of field to image border; and
$f_w$ is width of the field of interest.

The distances are given as examples, for example $f_x$ may be computed from the leading edge of the image, etc.

Figure 4:
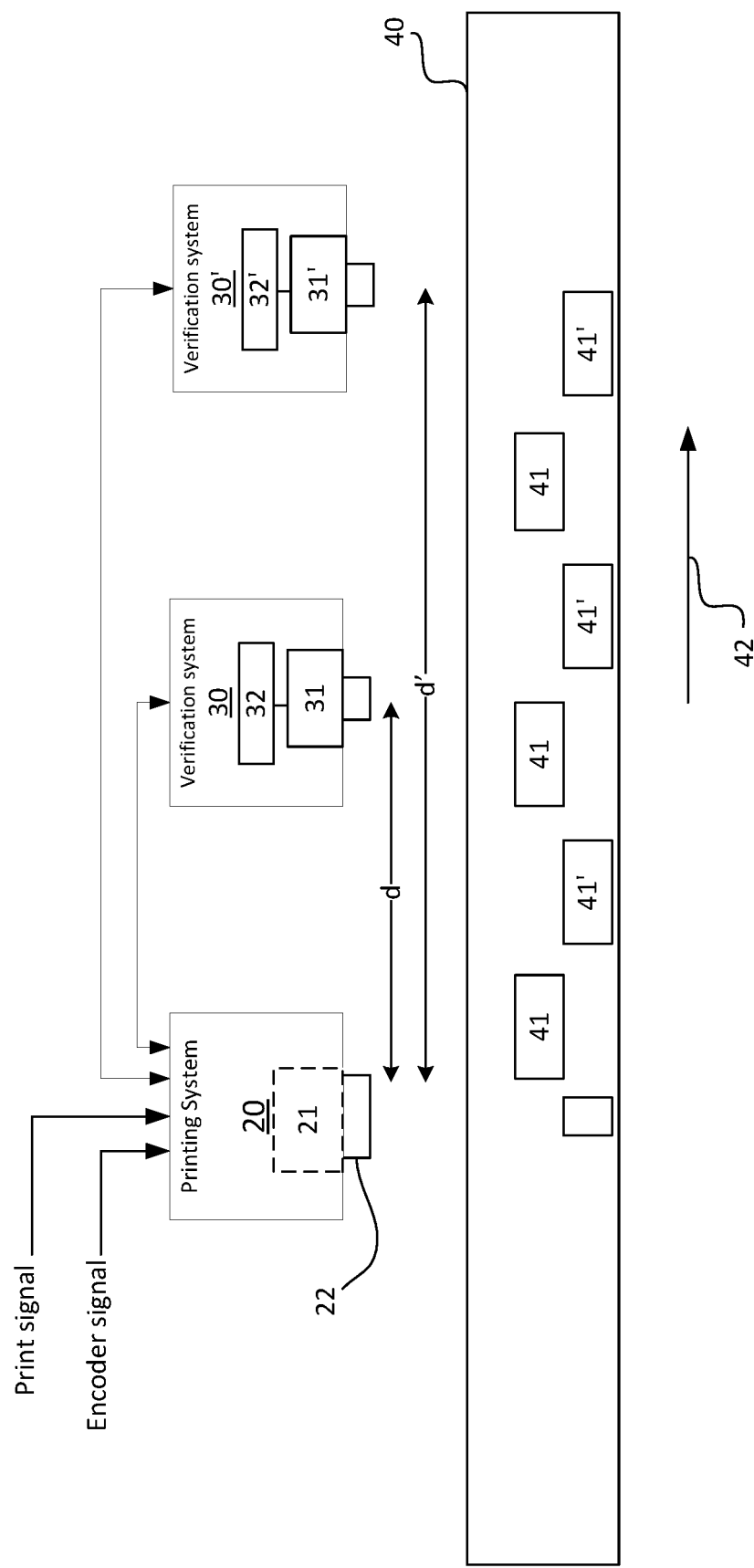
FIG. 4 is a diagram of a third exemplary system in which methods and systems described 35 herein may be implemented.

FIG. 4 illustrates another exemplary embodiment, in which at least two verification systems 30 and 30' are included.

This may for example be the case when the field of view of a single camera is not sufficient to include all the visual features that require verification.

One typical application may be where both features of the pre-printed substrate and the printed image need to be verified to ensure that correct data is printed onto the correct substrate packaging. "d" and "d" represent trigger distances to the image recording (and verification) system.

Consequently, this is naturally supported by extending the printer system 20 to manage e.g. two independent print trigger queues to trigger two cameras 31 and 31' of the verification systems 30 and 30'.

Similarly the same embodiment would find use in traversing applications where the printer 25 is physically moved to a different location to print between prints. Each print location may be served by its own camera.

Figure 5:
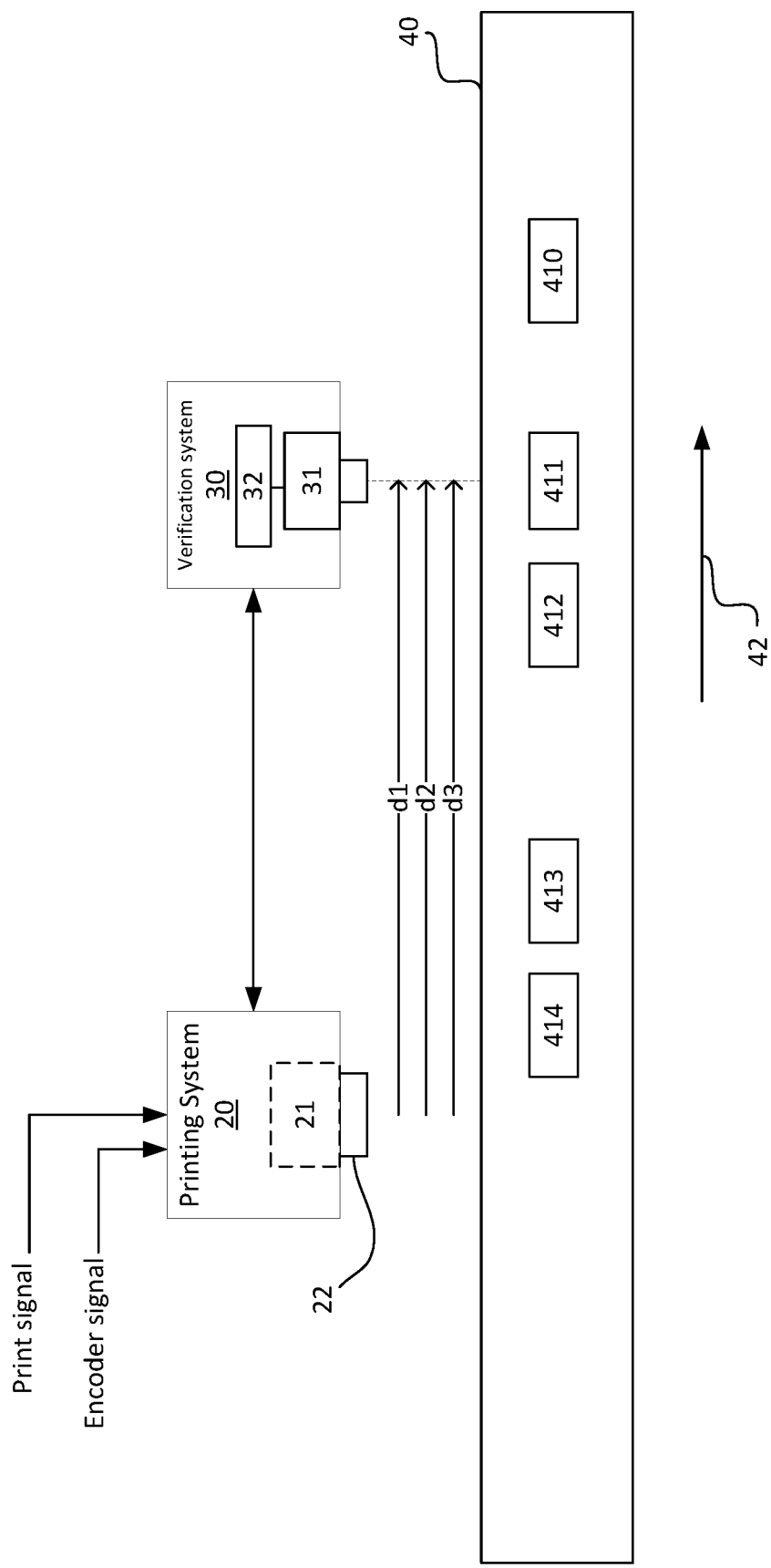
FIG. 5 is a diagram of a fourth exemplary system in which methods and systems described herein may be implemented.

In yet another embodiment, as shown in diagram of FIG. 5, when a print signal is received, the printer system may be in dynamic control of how much the substrate 40 should travel beneath the print-head 22 before printing. This can lead to dynamic variation in the distance between prints on the substrate. This may typically be controlled by a user "registration" distance but may be subject to dynamic variation caused by factors, such as:

Substrate speed: If the substrate travels at too low speed to print, the printer will delay the first dot of the image until the substrate speed has increased above the printable threshold.

Consumables management: The printing system may delay if the first dot of the print until the printing consumables (e.g. for TTO, ribbon) is in appropriate state. Alternatively, the printing system may print the first dot of the printer earlier on the substrate if the consumables state degrades away from optimal.

Images 410 to 413 represent prints at $d_1$ to $d_3$.

Figure 6:
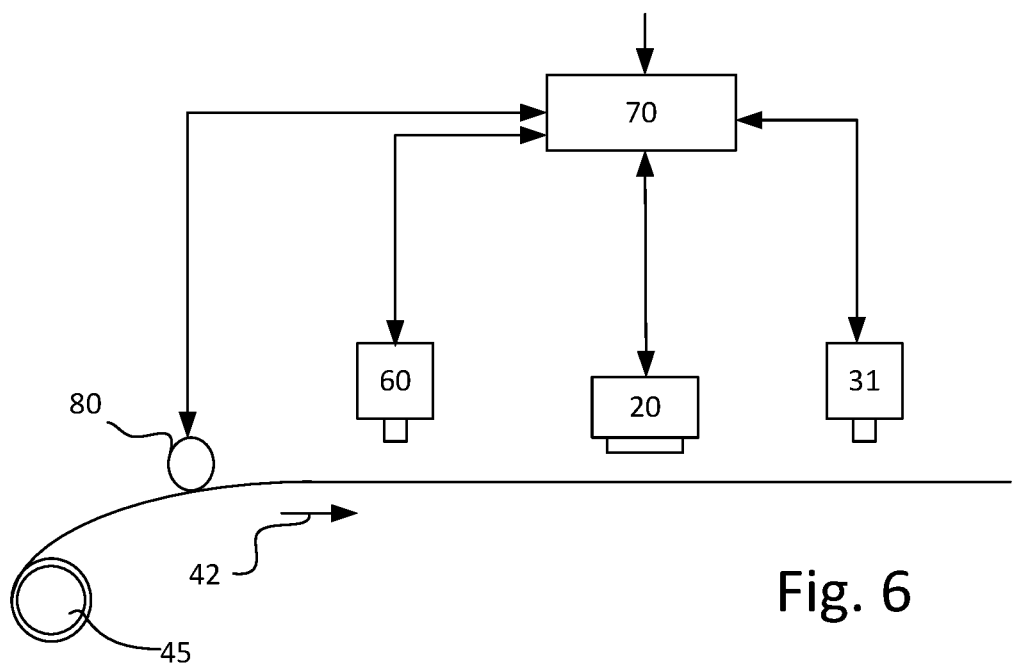
FIG. 6 is a diagram of a fifth exemplary system in which methods and systems described herein may be implemented.

Another embodiment of the invention is illustrated in diagram of FIG. 6. This embodiment may be used for example for verification of data, e.g. a film stock code verification with expiry and later stage customization marking and verification with one controller and encoder.

The invention according to this embodiment comprises a controller 70, a first image recorder 60, an encoder 80 and a second image recorder 31. The substrate 40 may comprises a film rolled out of a roll 45. In this case the controller 70 also comprises a verification processing unit. The first and second cameras 60 and 31 may be configured to record different types of coding, for example ink (e.g. UV and ordinary ink), thermal effects, etc.

Figure 8:
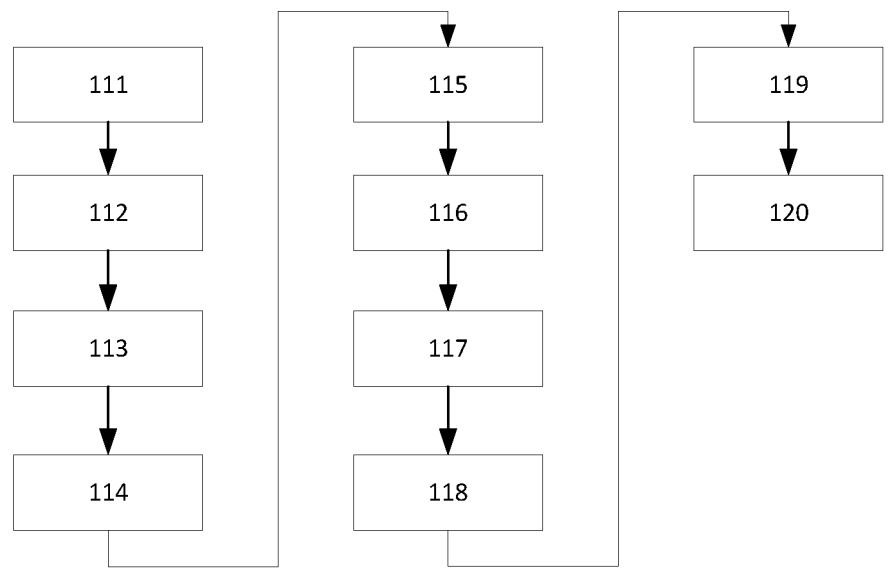
FIG. 8 is schematic diagram illustrating method steps according to one embodiment of the invention.

The controller 60 tracks the film movement via the encoder 80. The first image recorder or camera 60 together with the verification unit may be used to verify that correct film is used as substrate. The controller 70 communicates with the two image recorders 60 and 31 (e.g. industrial cameras). This, e.g. Ethernet based communication, may deliver symbolic tags (or similar strings) to select an appropriate film product code to verify on the film and the appropriate product code using camera 60 to verify on the product marking. The product marking camera 60 may for example leverage a UV Black ribbon solution. The controller 60 may also deliver information to be printed as the product marking code. The controller 60 may interface with a manufacturer's "Form-Fill-Seal (FFS) machine" (a unit for manufacturing a package, filling it and sealing the same) delivering the results of the camera verification inspections in less than, e.g. 100 ms. The camera trigger (image acquisition request) send from the printer to the second camera 31 (as described in previous embodiments) is sequenced from the printer start of print, eliminating additional sensors dedicated to the cameras. Thus, the solution of the present invention drastically reduces setup time and simplifies/reduces Form-Fill-Seal operators' tasks. Normally, the FFS operator would have to train and or independently setup the printer, film verification and printed code verification cameras with the current solutions, e.g. solutions not using printer triggered camera. The current solutions also rely on the operator to determine the right message to be printed and rely on the operator to select the right film to be trained. The FFS Film solution of the present invention may be connected to the producers Enterprise Resource Planning (ERP) via central design an printer data management software to ensure that the right film stock code and right late stage product code is being utilized. The operator may simply select the product to be run and the solution delivers the right code to be printed and inspected as well as the right film to be utilized. This may be achieved by exemplary steps according to FIG. 8:

Recording (111) a field of interest by the first image recorder 60;

Providing (112) by the image recorder 60 image data to the controller 70;

Controlling and verifying (113) data by the controller 70 based on the image data;

Transmitting (114) print data to the printing system 20 with respect to the data from the image recorder 60;

Printing (116) information by the printing system 20 with respect to the received print data;

Providing (117) a trigger signal by the printer to the controller 70 or the image recorder 31;

Recording (118) image by the second image recorder 31 when receiving trigger signal;

Providing (119) recorded image data to the controller 70 for verification (120).

Thus, the invention provides a complete solution to resolve the issues of ensuring the producer has the right substrate, e.g. film for the right product with the right code printed legibly. Therefore eliminating waste and protecting the producers brand and the customer from incorrect package, e.g. potential allergy concern or incorrect expiry date, e.g. food poisoning.

Figure 7:
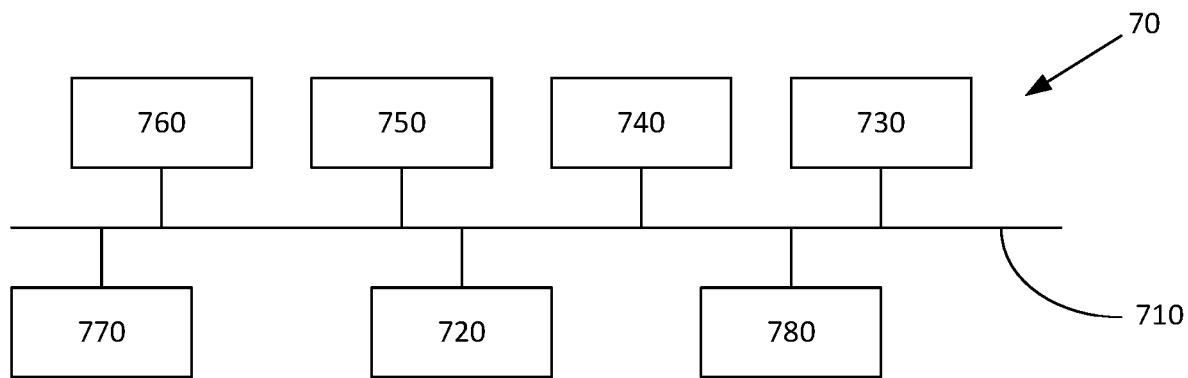
FIG. 7 is a diagram of a controller system according to one embodiment of the invention.

FIG. 7 is an exemplary diagram illustrating one embodiment of a control system 70 or 32 for controlling printer and/or camera and/or processing verification data and in which methods and systems described herein may be implemented. System 70 may include a bus 710, a processor 720, a memory 730, a read only memory (ROM) 740, (optional) a storage device 750, an input device 760, an output device 770, and a communication interface 780. Bus 710 permits communication among the components of system 70. System 70 may also include one or more power supplies (not shown). One skilled in the art would recognize that system 70 may be configured in a number of other ways and may include other or different elements.

Processor 720 may include any type of processor or microprocessor that interprets and executes instructions. Processor 720 may also include logic that is able to decode media files and generate output. Memory 730 may include a random access memory (RAM) or another dynamic storage device that stores information and instructions for execution by processor 720. Memory 730 may also be used to store temporary variables or other intermediate information during execution of instructions by processor 720.

ROM 740 may include a conventional ROM device and/or another static storage device that stores static information and instructions for processor 720. Storage device 750 may include a magnetic, optical or solid-state "disk" and its corresponding drive and/or some other type of recording medium and its corresponding drive for storing information, e.g. distance between printer and verification system, product data to be printed, comparison data and instructions. Storage device 750 may also include a flash memory (e.g., an electrically erasable programmable read only memory (EEPROM)) device for storing information and instructions.

Input device 760 may include one or more conventional mechanisms that permit a user to input information to the system 70, such as a keyboard, a keypad, a directional pad, a mouse, a pen, voice recognition, a touch-screen and/or biometric mechanisms, etc. Output device 770 may include one or more conventional mechanisms that output information to the user, including a display, a printer, one or more speakers, etc. Communication interface 780 may include any transceiver-like mechanism that enables system 70 to communicate with other devices (e.g. printers, encoders, cameras) and/or systems. For example, communication interface 780 may include a modem or an Ethernet interface to a LAN. Alternatively, or additionally, communication interface 780 may include other mechanisms for communicating via a network, such as a wireless network. For example, communication interface may include a radio frequency (RF) transmitter and receiver and one or more antennas for transmitting and receiving RF data.

The system 70 may also display information associated with the process in a graphical forma. According to an exemplary implementation, system 70 may perform various processes in response to processor 720 executing sequences of instructions contained in memory 730. Such instructions may be read into memory 730 from another computer-readable medium, such as storage device 750, or from a separate device via communication interface 780. It should be understood that a computer-readable medium may include one or more memory devices or carrier waves. Execution of the sequences of instructions contained in memory 730 causes processor 720 to perform the acts that will be described hereafter. In alternative embodiments, hard-wired circuitry may be used in place of or in combination with software instructions to implement aspects consistent with the invention. Thus, the invention is not limited to any specific combination of hardware circuitry and software.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The various embodiments of the present invention described herein may be described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The above mentioned and described embodiments are only given as examples and should not be limiting to the present invention. Other solutions, uses, objectives, and functions within the scope of the invention as claimed in the below described patent claims should be apparent for the person skilled in the art.

What we claim is:

1. A verification system for verification of a print-out from a printing device, the verification system comprising at least one image recording device arranged at a distance from the printing device, wherein the distance is a trigger distance between the print head of the printing device and a focal point of the at least one image recording device and the printing device comprises a controller and the controller is configured to:
    instruct a print head of the printing device to print on an area on a substrate;
    compute a time when the printed area passes the focal point of a field of view of the image recording device after the printout operation by the print head of the printing device with respect to the trigger distance from the printing device, the trigger distance from the printing device being stored in a memory of the printing device;
    at the computed time, generate a trigger signal to said image recording device with respect to the trigger distance, which trigger signal activates said image recording device to capture an image of the printed area; and
    process the captured image for detecting if the printout meets certain parameters.

2. The verification system according to claim 1, wherein the trigger signal generated by said printing device is generated with respect to a printed image parameter printed by said printing device.

3. The verification system according to claim 1, wherein the trigger signal further depends on one or several of:
    size of a printed image;
    an area of interest on the printed image.

4. The verification system according to claim 1, wherein the verification system is arranged in a continues printing application in which the substrate and the printing device move relative each other.

5. The verification system according to claim 4, wherein the substrates moves and printing device is stationary.

6. The verification system according to claim 4, wherein the printing device moves and the substrate is stationary.

7. The verification system according to claim 4, wherein the controller is configured to receive information about the relative speed of the substrate.

8. The verification system according to claim 1, further comprising a second image recording device.

9. The verification system according to claim 8, wherein the second image recording device is configured to verify a second set of data.

10. The verification system according to claim 9, wherein the second set of data is one or several of: packaging information; substrate information or content information.

11. The verification system according to claim 1, configured to monitor a number of trigger distances concurrently with respect to a number of distinct prints between the print head and the focal point of the visual field of the image recording device.

12. The verification system according to claim 1, wherein the trigger distance for generating the trigger signal is offset to focus on a specific feature of a print on the printed area.

13. The verification system according to claim 11, wherein the trigger distance is represented by:

$$td = d + ((iw - fx) - (fw/2))$$

wherein
td is the trigger distance;
d is a camera trigger distance;
iw is an image width;
fx is a position of field to image border; and
fw is width of the field of interest.

14. A printing device comprising:
a controller,
at least one print head;
wherein the controller is configured to:
control a print head of the printer device to print on an area on a substrate;
communicate with a verification system for verification of the print on the area, the verification system comprising at least one image recording device arranged at a distance from the printing device, the distance from the printing device being stored in a memory of the printing device, and the distance is a trigger distance between the print head of the printing device and a focal point of the at least one image recording device;
compute when the printed area passes the focal point of a field of view of the image recording device after the printout operation by the print head of the printing device with respect to the trigger distance from the printing device; and
generate a trigger signal to said image recording device with respect to the trigger distance, which trigger signal activates said image recording device to capture an image of the printed area.

15. In a printing system, a method of capturing a visual image of a particular area of focus in a printed area for determining if a print-out meets particular criteria, the method comprising:
generating by a controller of the printing device a trigger signal and transmitting the trigger signal to an image recording device, the signal generated with respect to a distance information stored in the memory of the printing device and corresponding to a distance between a print head of the printing device and a focal point of a field of view of the image recording device; and
the image recording device capturing an image of the print-out upon receiving the trigger signal from the controller of the printing device.

16. The method of claim 15, the method further comprising:
recording a field of interest by a first image recorder;
providing by the image recorder image data to the controller;
verifying a parameter by the controller based on the image data; and
providing the print data to the printing system with respect to the data from the first image recorder.

17. A verification system for verification of a printout from a printing device, the verification system comprising at least one image recording device arranged at a distance from the printing device, wherein the printing device comprises a controller configured to:
instruct a print head of the printing device to print on an area;
monitor a number of trigger distances concurrently with respect to a number of distinct prints between the print head and the visual field of the image recording device;
compute when the printed areas pass a field of view of the image recording device after the printout operation by the print head of the printing device with respect to the distance stored in a memory of the printing device;
wherein a trigger distance, $t_d$, is represented by:

$$t_d = d + ((i_w - f_x) - (f_w/2))$$

wherein
d is a camera trigger distance;
$i_w$ is an image width;
$f_x$ is a position of field to image border; and
$f_w$ is width of the field of interest;
generate a signal to said image recording device, which signal activates said image recording device to capture an image of the printed area, and
to monitor a number of trigger distances concurrently with respect to a number of distinct prints between the printer head and the visual field of the image recording device.

18. A method in a printing system for capturing a visual image of a particular area of focus in a printed area for determining if a print-out meets particular criteria, the method comprising:
a. generating by a controller of the printing device a signal and transmitting the signal to an image recording device, the signal generated with respect to a distance information stored in the memory of the printing device and corresponding to a distance between a print head of the printing device and a field of view of the image recording device;
b. the image recording device capturing an image of the print-out when receiving the signal from the controller of the printing device; and
c. wherein the distance, $t_d$, is represented by:

$$t_d = d + ((i_w - f_x) - (f_w/2))$$

wherein
d is a camera trigger distance;
$i_w$ is an image width;
$f_x$ is a position of field to image border; and
$f_w$ is width of the field of interest.

* * * * *